United States Patent [19]

Mercer

[11] 4,059,713
[45] Nov. 22, 1977

[54] EXTRUDED PLASTICS NET OR MESH STRUCTURES

[75] Inventor: Frank Brian Mercer, Blackburn, England

[73] Assignee: Netlon Limited, Blackburn, England

[21] Appl. No.: 716,560

[22] Filed: Aug. 23, 1976

[30] Foreign Application Priority Data

Sept. 5, 1975 United Kingdom ............... 36729/75

[51] Int. Cl.² .............................................. B32B 5/12
[52] U.S. Cl. ..................................... 428/36; 156/166;
156/181; 156/229; 264/167; 264/DIG. 81;
428/107; 428/255; 428/910
[58] Field of Search ............... 428/105, 107, 108, 112,
428/135, 137, 225, 255, 257, 131, 910, 36;
264/167, DIG. 81; 156/166, 167, 180, 181, 229,
244, 245

[56] References Cited

U.S. PATENT DOCUMENTS

| 2,919,467 | 1/1960 | Mercer | 428/255 |
|---|---|---|---|
| 3,019,147 | 1/1962 | Nalle | 428/255 |
| 3,255,065 | 6/1966 | Wyckoff | 428/137 |
| 3,386,876 | 6/1968 | Wyckoff | 428/131 |
| 3,387,077 | 6/1968 | Simmons et al. | 428/131 |
| 3,874,969 | 4/1975 | Hurean et al. | 428/107 |
| 3,968,621 | 7/1976 | Poupitch | 264/DIG. 81 |

*Primary Examiner*—James J. Bell
*Attorney, Agent, or Firm*—Holman & Stern

[57] ABSTRACT

An extruded plastics mesh having two sets of oblique strands lying in adjacent planes and joined together at their crossing points by tenacious intersections is suitably stretched to form a structure having mesh openings each of which is a six-sided figure bounded on four sides by portions of four separate strands and on the other two sides by strandlike members comprising stretched intersections of the original mesh. To inhibit splitting of the structure along the length of the stretched intersections there is provided at opposite ends of each such intersection a relaxed web integral with the structure and extending across the crotch defined by the two strands which form the intersection.

3 Claims, 4 Drawing Figures

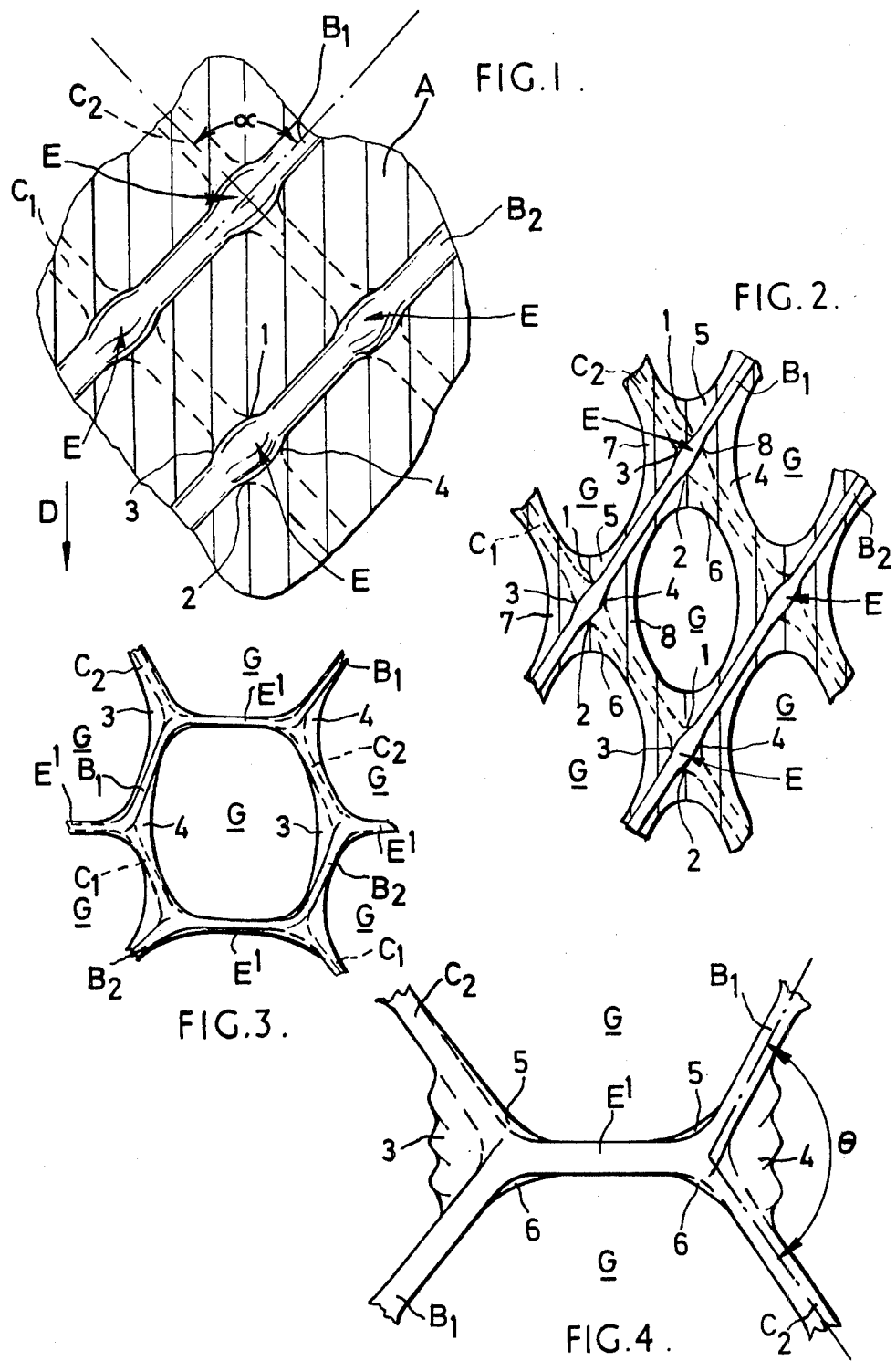

EXTRUDED PLASTICS NET OR MESH STRUCTURES

This invention relates to extruded plastics mesh of the type comprising two sets of strands lying in adjacent planes (i.e. bi-planar) each set extending obliquely to the other and the sets joined together at their crossing points by tenacious intersections or junctions. Such intersections or junctions (hereinafter referred to as "intersections") may be produced either as confluent integral (i.e. unbonded) intersections formed before or as the mesh strands are extruded or may become confluent by adhesive bonding of one extruded strand to another where they cross in contact, the adhesive bond being tenacious due to there being an adequate area of contact between the strands to prevent one strand being torn or stripped from the other under stresses applied to either strand or both for the purpose of stretching and molecularly orientating the plastics material of which the mesh is composed.

It is known to be advantageous to subject extruded or cast mesh of the above type to treatment whereby the mesh strands are stretched with concomitant molecular orientation of the plastics material from which the mesh is cast. The term "molecular orientation" is used in the sense of its normal meaning in plastics technology, but refers to molecular orientation by stretching as opposed to melt flow orientation and the presence of, and degree of, molecular orientation can be ascertained by recognised methods of determination and quantification such as X-ray diffraction or optical bi-refringence. Where the term "orientation" (or a derivative) is used herein it means "molecular" orientation.

In order to stretch such mesh structures effectively, it is essential that the mesh structure as a whole can stand up to resultant physical changes in the strand and intersection structures individually so that after the whole structure has been stretched it remains an effective structure and does not experience stripping of the intersections so that the mesh, when put to use, may be liable to disintegrate locally or fall apart into a collection of disconnected strands.

Mesh structures of the type indicated suffer one economic disadvantage and that is that the intersections of such mesh structures after stretching in known manner, contain excess quantities of unstretched and unorientated resin which do not contribute to the useful physical properties of the net, more particularly strength and texture.

The excess and useless quantity of resin remaining in the intersections represents a very significant economic factor as well as seen from the following data produced by the Shirley Institute of Didsbury, Manchester:

| Type of Mesh Structure | % of total mesh weight contained in mesh intersections. |
| --- | --- |
| Fine net (5 strands/ inch) for produce packaging | 52.2 |
| Fine net (2 strands/ inch) for produce packaging | 48.8 |
| Crop protection net, ¾ inch mesh | 64.7 |

The structure of an intersection of an oriented strand mesh of the type indicated is a generally cruciform mass, the mesh strands being extensions of the arms of the cruciform mass. Thus between each adjacent pair of strands where they enter or leave the intersection mass there is a V-shaped crotch, the base of which may be sharp or rounded, but which in either case represents an incipient tear point at which the mesh structure may rupture. When an intersection is considered in its direction of extrusion, hereinafter referred to as the "machine direction" (or MD) each intersection has an upstream and a downstream crotch and transversely to the machine direction, hereinafter referred to as the "transverse direction" (or TD) each intersection has a lefthand and a right-hand crotch.

In order to provide for improved uniformity of molecular orientation throughout the mesh structure and to eliminate the above structural weaknesses generated at the intersection crotches there has been proposed a method of causing molecular orientation of the resin in the mesh intersection crotches. This method is set out in U.K. Patent Specification No. 969,205 in the same of Arnaldo Monosilio published on 9 September 1964 and, briefly, comprises submitting the net mesh to a stretching process applied simultaneously to all the net strands in each of two stages and in two directions to orientate the molecules in the intersections in two directions. In this known procedure, while molecular orientation takes place in the intersection crotches, the resin content in the intersection remains concentrated as an integral mass having no major dimension, so that while the tendency of the intersection to rupture at any of the crotches is eliminated or greatly reduced, there remains a high proportion of excess and wasted resin in the intersections which plays no useful part in the physical properties of the net.

It is an object of the present invention to produce an improved mesh structure of the type indicated wherein all or the greatest proportion of the plastic material of the mesh is in a molecularly orientated state throughout the mesh structure but without producing incipient tear points at the intersection crotches whereby the resultant mesh structure has one or more of the following advantages:

a. improved "handle" in that it is more limp and pliable than extruded plastics net heretofore and is more like a conventional textile product.
b. has unimpaired or improved strength,
c. reduction or virtual elimination of resin wastage heretofore inherent in the intersections of extruded plastics nets, the above terms "improved", "more limp and pliable", "unimpaired", mean in comparison with conventional extruded plastics mesh structures of similar mesh size, mesh count and strand denier.

Certain molecularly orientated linear resins, e.g. high density linear Ziegler process polyethylene, exhibit a tendency to fibrillate or split longitudinally and, in the extruded nets of the structure with which the present invention is concerned, viz., nets having hexagonal meshes bounded on two opposite sides by stretched molecular orientated strand-like members each comprising confluent portions of a pair of single strands, the strand-like members may split or tear along their length starting from the end crotches unless this tendency is inhibited or eliminated. In co-pending U.K. Patent application No. 25267/75 in the name of Netlon Limited, there is described a mesh structure having hexagonal meshes bounded on two opposite sides by stretched molecularly orientated strand-like members each comprising confluent portions of a pair of single strands, in which the tendency of the strand-like members to split or tear along their length starting from the end crotches is inhibited or eliminated by a residual portion of unorientated plastic material provided at each end of the stretched molecularly orientated strand-like member in the region of the junction of the member with the pair of strands from which the member is formed. This unorientated material serves as a barrier against splitting or tearing of the structure along the length of the strand-like member particularly when the net is made of a resin which exhibits a tendency to split longitudinally.

The present invention offers an alternative solution to this problem by providing across the tear starting point at each crotch at the ends of each strand-like member, a web of stretched plastics material in an untensioned state. The webs in question are in a relaxed form which may be of a curved, wavy or pleated configuration across their width, so that no tearing stress can be applied to them to tear them and so allow a tear to advance to the adjacent end of the strand-like member unless and until the pair of strands in whose included angle each web lies are pulled oppositely and the included angle tends towards 180°. This situation is, however, most unlikely to occur in practice as it could only arise when the net meshes have been totally collapsed by either the application of extreme machine direction or transverse direction tensions, in which condition the net could not be put to use.

The invention accordingly consists in a mesh structure of extruded plastics material of the type indicated and having mesh openings each of which is a six-sided figure bounded on four sides by portions of four separate strands and on two oppositely disposed sides by strand-like members comprising confluent portions of pairs of said four strands, wherein all of said portions of said strands and both of said strand-like members comprise stretched molecularly oriented material and wherein at opposite ends of each strand-like member there is provided in and across the included angle of the crotch between each pair of strands which merge into crotch between each pair of strands which merge into the confluent portion and integral therewith a web serving to inhibit longitudinal splitting or tearing of the strand-like member.

To obtain mesh structures in accordance with the present invention an extruded mesh of the type indicated is cast so that a web is formed in all or certain of the crotches of each intersection, i.e. bridging the apex of the included angle between pairs of strands forming a crotch.

The provision of webs in the crotches is obtained by suitable profiling of the strand extrusion dies or by spacing the inner and outer die members fractionally apart to provide an annular die opening between the inner and outer dies through which a thin membrane is extruded integrally with the strands and intersections, as described in British Pat. No. 836,556; this membrane will rupture and largely disappear when the net is subjected to the stretching operation leaving only vestiges which comprise the webs in the crotches. Initial stretching of the as-cast product is such as to stretch only the mesh strands so as to molecularly orientate the strand molecules and leave the mesh intersections unstretched and orientated When the yield of the strands has been substantially reduced by stretching, it has been found that continued stretching of the product can cause the mesh intersections to commence to stretch so that the intersections commence to yield and elongate and each mesh opening gradually transforms from a four-sided diamond shape into a six-sided figure, four sides of which are constituted by portions of four separate stretched strands and the fifth and sixth sides of which are constituted by the elongated intersections which have stretched into members of strand-like form, such as strand-like members comprising orientated plastics material.

It is convenient in producing mesh structures in accordance with the invention, initially to extrude the mesh in tubular form from a counter-rotating concentric pair of circular dies each having a circular series of spaced extrusion die orifices as described and illustrated in British Patent Specification No. 836,555, the cast product having confluent integral intersections with the strands being divisions of the intersections producing a diamond mesh each mesh opening having one diagonal which extends in the direction of extrusion or "machine direction" and the other diagonal of which extends transversely thereto in the "transverse direction".

To stretch and orientate the mesh strands it is possible to apply tension to the mesh structure either in the machine direction or in the transverse direction. For subsequent stretching and orientation of the intersections it is also possible to perform the stretching operation in either the machine or transverse direction to produce the elongated intersections which comprise the strand-like members extending either in the machine direction or in the transverse direction respectively. It is preferred however to perform the intersection stretching operation in the transverse direction. This is because, when extruding net from counter-rotating dies as outlined above, it has been found that it is simpler to control the formation of the left and right hand transverse crotches rather than the upstream and downstream machine direction crotches and accordingly in carrying out the present invention it is preferred to stretch the intersection in the transverse rather than in the machine direction. To perform transverse stretching of the intersections it is also necessary in casting the net to ensure that in the counter-rotating die process the mesh strands are cast at a relatively high mesh angle (e.g. of the order of about 90° – 110°).

The webs in the crotches, may in certain cases be stretched as the final stage by applying tension to the hexagonal meshes in the appropriate direction so as to cause the included angle between each pair of strands in which the web lies to tend towards 180°. Thus, webs in the transverse direction crotches can be stretched by the application of machine direction tension and webs in the machine direction crotches can be stretched by the application of transverse direction tension.

The invention will now be described by way of an example with reference to the accompanying drawings in which:

FIG. 1 is a view of a portion of extruded plastics material as cast using a process and apparatus as shown and described in British Patent Specification No. 836,556, FIG. 2 is a reduced scale view of the material after having been subjected to machine direction stretching, FIG. 3 is a view of the material of FIG. 2 after having been subjected to transverse direction stretching and FIG. 4 is an enlarged view of a part of the material shown in FIG. 3 after having been subjected to machine direction stressing.

Referring to FIG. 1, plastics material is initially extruded in tubular form using apparatus of the type described in British Patent Specification No. 836,556 and which comprises a counter-rotating concentric pair of circular dies each having a circular series of spaced extrusion die orifices with the dies themselves being radially spaced apart to define a narrow annular gap between the respective sets of die orifices. With this arrangement, a thin film or membrane A is continuously extruded through the narrow annular gap integrally with a netting structure extruded through the die orifices and comprising a first set of paralleled strands $B^1$, $B^2$ on one face of the membrane and a second set of paralleled strands $C^1$, $C^2$ on the opposite face of the membrane, each set of strands extending obliquely to the direction of extrusion (arrow D) and being joined at their crossing points by integral intersections E formed with the die orifices of the respective sets are mutually in register whilst the strands themselves are formed as divisions of the intersections as the die orifices move out of register. Each intersection E of the material has upstream and downstream crotches 1 and 2 respectively and transverse crotches 3 and 4 to produce structures in accordance with the invention, the relative speed of rotation of the respective extrusion dies should be controlled to provide a mesh angle $\alpha$ of about 90° – 110°.

After extrusion the material shown in FIG. 1 is stretched in the direction of extrusion or machine direction by any conventional stretching means, for example differential speed draw rollers in order to stretch and molecularly orientate the strands B and C whilst leaving the intersections unstretched and unorientated. This stretching operation, also causes the membrane A to rupture forming mesh openings G as shown in FIG. 2 where it is also apparent that the membrane remnants form webs 5, 6, 7 and in the intersection crotches.

The structure shown in FIG. 2 is then subjected to transverse stretching in order to stretch and molecularly orientate the mesh intersections E. This transverse stretching operation may for example be carried out with the material in tubular form using apparatus which comprises a diverging internal mandrel arrangement over and along which the tubular material is caused to travel, the mandrel arrangement comprising a hollow internal mandrel and a flexible carrier sleeve toroidally embracing the mandrel and with which the material moves over the outer mandrel surface.

This transverse stretching operation causes the intersections E to be stretched and molecularly orientated into strandlike members E' (FIG. 3) so that a mesh structure results in which each mesh opening G is substantially an hexagonal figure bounded on four separate sides by portions of four separate molecularly orientated strands $B_1$, $B_2$, $C_1$, $C_2$ and on the other two sides by the strandlike molecularly orientated members E' which are confluent sections of pairs of said strands (i.e. stretched intersections). Also, the transverse stretching operation causes the webs 5 and 6 in the upstream and downstream intersection crotches virtually to disappear whilst the webs 3 and 4 in the transverse crotches remain intact.

Finally the structure shown in FIG. 3 may be subjected to a machine direction stressing operation by applying longitudinal tension causing the included angle $\theta$ between the strands in which the webs 3 and 4 are located to tend towards 180° thereby slightly stretching these webs so that when the tension is released the webs assume a relaxed form as shown in FIG. 4 thereby providing barriers against splitting of the structure along the length of the elongated intersections E'.

I claim:

1. A mesh structure of extruded plastics material having mesh openings each of which is a six-sided figure bounded on four sides by portions of four separate molecularly orientated mesh strands and on two oppositely disposed sides by molecularly oriented strandlike members comprising confluent portions of pairs of said four strands wherein at opposite ends of each strandlike member there is provided in and across the included angle of the crotch between each pair of strands which merge into the confluent portion and integral therewith a web to inhibit longitudinal splitting or tearing of the strandlike member.

2. A mesh structure as claimed in claim 1 wherein the structure is in tubular form.

3. A mesh structure as claimed in claim 2 wherein said strandlike members extend substantially transversely of the tube.

* * * * *